(12) United States Patent
Yanagisawa

(10) Patent No.: US 11,550,107 B2
(45) Date of Patent: Jan. 10, 2023

(54) OPTICAL WAVEGUIDE SUBSTRATE AND METHOD FOR MANUFACTURING OPTICAL WAVEGUIDE

(71) Applicant: SHINKO ELECTRIC INDUSTRIES CO., LTD., Nagano (JP)

(72) Inventor: Kenji Yanagisawa, Nagano (JP)

(73) Assignee: SHINKO ELECTRIC INDUSTRIES CO., LTD., Nagano (JP)

(*) Notice: Subject to any disclaimer, the term of this patent is extended or adjusted under 35 U.S.C. 154(b) by 12 days.

(21) Appl. No.: 17/231,097

(22) Filed: Apr. 15, 2021

(65) Prior Publication Data

US 2021/0333493 A1 Oct. 28, 2021

(30) Foreign Application Priority Data

Apr. 27, 2020 (JP) .............................. JP2020-078687

(51) Int. Cl.
*G02B 6/42* (2006.01)

(52) U.S. Cl.
CPC ......... *G02B 6/4246* (2013.01); *G02B 6/4249* (2013.01)

(58) Field of Classification Search
CPC .. G02B 6/4249; G02B 6/122; G02B 6/12002; G02B 6/132; G02B 6/4246; G02B 6/4214; G02B 6/12004
USPC .......................................................... 385/31
See application file for complete search history.

(56) References Cited

U.S. PATENT DOCUMENTS 9,195,001 B2 * 11/2015 Hatori .................... G02B 6/305

FOREIGN PATENT DOCUMENTS

| JP | 2010-164654 | 7/2010 |
| JP | 2012-113030 | 6/2012 |

* cited by examiner

*Primary Examiner* — Michael P Mooney
(74) *Attorney, Agent, or Firm* — Rankin, Hill & Clark LLP

(57) ABSTRACT

An optical waveguide substrate includes: a substrate; a clad disposed on a plane of the substrate and made of a transparent material; and a plurality of cores that are surrounded by the clad, extend in parallel with the plane of the substrate and are made of a transparent material having a refractive index different from a refractive index of the clad, the cores including at least a pair of cores with diameters different from each other. The cores are provided at positions where centers of sections of the cores are all positioned in a straight line.

9 Claims, 15 Drawing Sheets

OPTICAL WAVEGUIDE SUBSTRATE AND METHOD FOR MANUFACTURING OPTICAL WAVEGUIDE

CROSS-REFERENCE TO RELATED APPLICATION

This application is based upon and claims the benefit of priority of the prior Japanese Patent Application No. 2020-078687, filed on Apr. 27, 2020, the entire contents of which are incorporated herein by reference.

FIELD

The embodiment discussed herein is related to an optical waveguide substrate and a method for manufacturing an optical waveguide.

BACKGROUND

An optical waveguide substrate obtained by forming, on an electrical substrate, an optical waveguide that transmits optical signals is sometimes used in recent optical modules such as optical modulators. The optical waveguide substrate has an electrical component such as an integrated circuit (IC) chip and a capacitor mounted on-board and has also an optical component such as a vertical cavity surface emitting laser (VCSEL) and a photo diode (PD) mounted on-board, for example. One end of the optical waveguide has an optical component connected thereto while the other end of the optical waveguide has, for example, an optical fiber, connected thereto.

An optical waveguide substrate sometimes has a multi-channel optical waveguide formed on-board. In other words, when an array chip including VCSEL(s) and PD(s), for example, is mounted, an optical waveguide that has a plurality of cores corresponding to the respective VCSEL(s) and PD(s) is formed. In some cases, one end of each of the cores has a VCSEL or PD connected thereto while the other end of the cores has a fiber array in which a plurality of optical fibers are arranged connected thereto. Conventional technologies are described in Japanese Patent Application Laid-open No. 2012-113030 and Japanese Patent Application Laid-open No. 2010-164654, for example.

The optimum core diameter of an optical waveguide serving as an optical path varies depending on the optical component connected to the optical waveguide. Specifically, because an optical output section of a VCSEL has a relatively large area, for example, it is desirable that an optical waveguide connected to the VCSEL has a relatively large core diameter. Meanwhile, because a light receiving section of a PD has a relatively small area, for example, it is desirable that an optical waveguide connected to the PD has a relatively small core diameter.

However, a plurality of cores of a multi-channel optical waveguide generally have the same core diameters, thereby increasing an optical coupling loss in a part where the optical component is connected to the core. In other words, the optical waveguide sometimes does not have a core diameter suitable for the area of an optical output section of a VCSEL or a light receiving section of a PD, thereby increasing an optical coupling loss.

It is conceivable that the diameters of the cores may be such as to correspond to the respective optical components to which the cores are connected. In this case, to one end of the optical waveguide having the cores with core diameters different from each other, optical components for the corresponding cores are connected. To the other end of the optical waveguide, a fiber array is connected. Because the cores have core diameters different from each other, the cores of the optical waveguide are not aligned with the cores of optical fibers, thereby increasing an optical coupling loss in a part where the optical waveguide is connected to the optical fibers.

SUMMARY

According to an aspect of an embodiment, an optical waveguide substrate includes: a substrate; a clad disposed on a plane of the substrate and made of a transparent material; and a plurality of cores that are surrounded by the clad, extend in parallel with the plane of the substrate and are made of a transparent material having a refractive index different from a refractive index of the clad, the cores including at least a pair of cores with diameters different from each other. The cores are provided at positions where centers of sections of the cores are all positioned in a straight line.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of an optical waveguide substrate and a method for manufacturing an optical waveguide discussed herein will be described in detail below with reference to the drawings. The embodiment does not limit the present invention.

Figure 1:
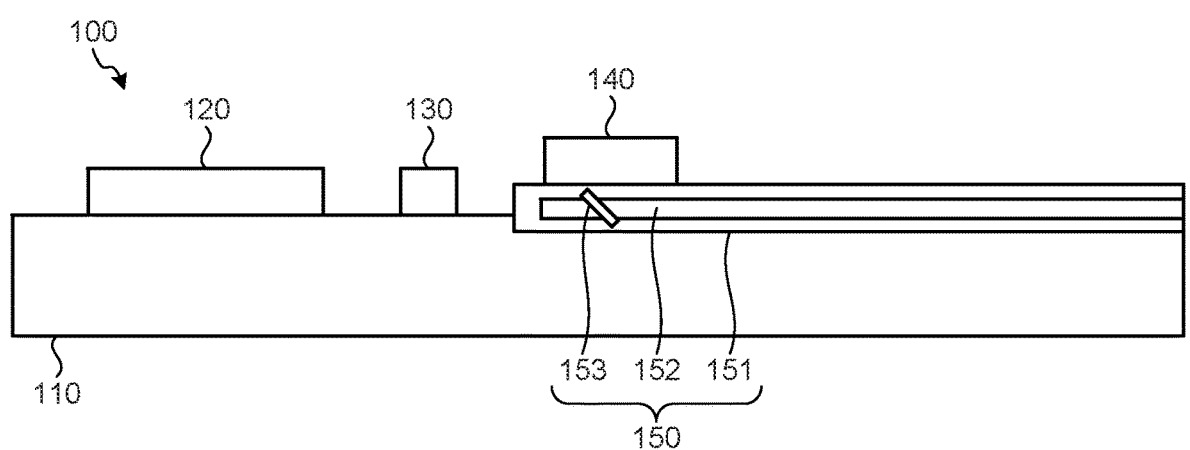
FIG. 1 is a section diagram illustrating a construction of an optical waveguide substrate according to an embodiment.

FIG. 1 is a section diagram illustrating a construction of an optical waveguide substrate 100 according to an embodiment. The optical waveguide substrate 100 illustrated in FIG. 1 has an electrical substrate 110, an IC chip 120, a capacitor 130, a VCSEL/PD array chip 140, and an optical waveguide 150.

The electrical substrate 110 is a substrate on which various electrical components and optical components are mounted. The electrical substrate 110 has a wiring layer formed on its surface, the wiring layer to which the electrical components and the optical components are connected. The electrical substrate 110 may be a multilayer substrate produced by stacking a plurality of insulating layers and wiring layers.

The IC chip 120 is an electrical component that performs signal processing using electric signals, and performs centralized control of the entire optical waveguide substrate 100. For example, the IC chip 120 generates or decodes electric signals.

The capacitor 130 is a rechargeable electrical component, and is charged and discharged as needed.

The VCSEL/PD array chip 140 is an optical component in which a VCSEL that is a light source for radiating laser light and a PD that is a light receiving element for outputting an electric signal in accordance with the optical power of received light are lined up. The VCSEL/PD array chip 140 may have a plurality of VCSELs and a plurality of PDs. The VCSEL(s) that the VCSEL/PD array chip 140 has radiates laser light in a vertical direction to the electrical substrate 110. The PD(s) that the VCSEL/PD array chip 140 has receives light in the vertical direction to the electrical substrate 110. In other words, the VCSEL/PD array chip 140 radiates light in a direction to the optical waveguide 150 disposed between the VCSEL/PD array chip 140 and the electrical substrate 110, or receives light from the optical waveguide 150.

The optical waveguide 150 transfers light radiated by the VCSEL(s) that the VCSEL/PD array chip 140 has in a direction parallel to the plane of the electrical substrate 110, and guides the light to an end of the electrical substrate 110. The optical waveguide 150 also transfers light from the end of the electrical substrate 110 in the direction parallel to the plane of the electrical substrate 110, and guides the light to the PD(s) that the VCSEL/PD array chip 140 has. At the end of the electrical substrate 110, a fiber array, which is not illustrated, is connected to the optical waveguide 150. The optical waveguide 150 has a clad 151, a plurality of cores 152, and a mirror 153.

The clad 151 is made of a transparent material such as a thermosetting or photo-curable epoxy resin and silicon dioxide ($SiO_2$), for example, and is placed so as to surround the cores 152. The clad 151 is made of a material having a refractive index different from that of the cores 152, and totally reflects light within the cores 152 at boundary surfaces with the cores 152.

The cores 152 are each made of a transparent material such as a thermosetting or photo-curable epoxy resin and silicon (Si), for example, and are provided to correspond to respective VCSEL(s) and PD(s) that the VCSEL/PD array chip 140 has. The cores 152 are paths through which light transfers and have different core diameters depending on the VCSEL or PD to which each core 152 is connected. In other words, the core to be connected to the VCSEL is a large-diameter core having a core diameter of about 60 μm, for example, and the core to be connected to the PD is a small-diameter core having a core diameter of about 20 μm, for example. At the end of the electrical substrate 110, cores of optical fibers that constitute the fiber array are connected to respective end faces of the cores 152.

The mirror 153 is provided to each of the cores 152, and changes the traveling direction of light by reflecting the light. Specifically, the mirror 153 that is provided to the large-diameter core to be connected to the VCSEL reflects light radiated by the VCSEL in the vertical direction to the electrical substrate 110, and causes the light to travel inside the large-diameter core that is in parallel with the electrical substrate 110. Specifically, the mirror 153 that is provided to the small-diameter core to be connected to the PD reflects light transferred from the end face of the small-diameter core in the direction parallel to the electrical substrate 110, and causes the light to travel to the PD that receives light in the vertical direction to the electrical substrate 110. Because the mirror 153 changes the traveling direction of light in this manner, the plane of the mirror 153 is inclined 45 degrees to the directions vertical and parallel to the electrical substrate 110.

Figure 2:
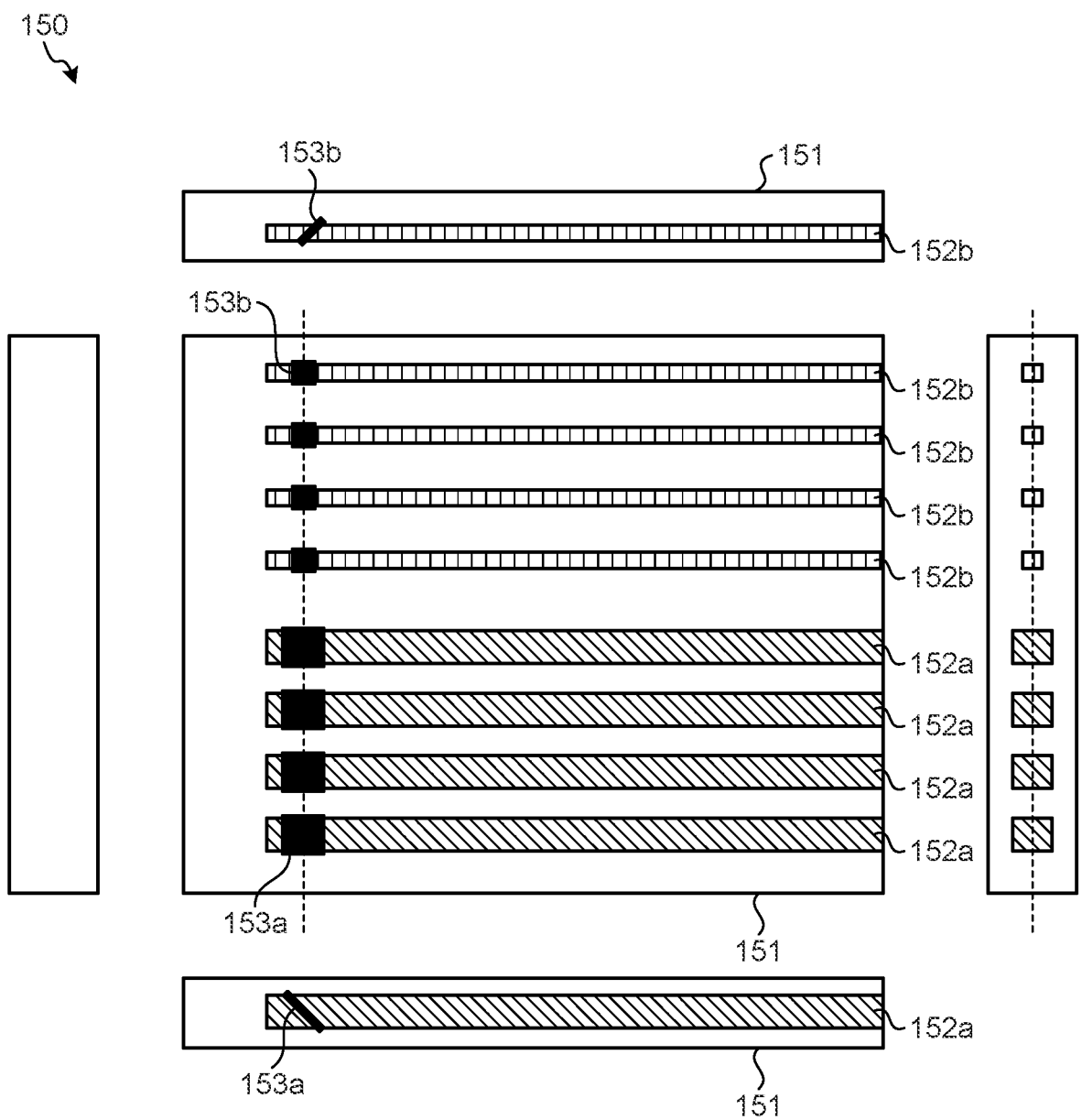
FIG. 2 is a five-view drawing illustrating the construction of the optical waveguide according to the embodiment.

FIG. 2 is a five-view drawing illustrating the construction of the optical waveguide 150. In other words, the central figure in FIG. 2 is a plan view of the optical waveguide 150 when viewed from above, the left figure is a left side view illustrating a left end face of the optical waveguide 150, the right figure is a right side view illustrating a right end face of the optical waveguide 150, the figure above is a rear view illustrating a rear face of the optical waveguide 150, and the figure below is a front view illustrating a front face of the optical waveguide 150.

As illustrated in FIG. 2, the optical waveguide 150 has four large-diameter cores 152a and four small-diameter cores 152b, and each of the large-diameter cores 152a has a mirror 153a disposed thereon and each of the small-diameter cores 152b has a mirror 153b disposed thereon. The large-diameter core 152a is a core to be connected to the VCSEL that the VCSEL/PD array chip 140 has, and the small-diameter core 152b is a core to be connected to the PD that the VCSEL/PD array chip 140 has. At the right end face of the optical waveguide 150, end faces of the large-diameter cores 152a and the small-diameter cores 152b are exposed.

The centers of these end faces of the large-diameter cores 152a and the small-diameter cores 152b are positioned in a straight line. In other words, the large-diameter cores 152a have core diameters different from those of the small-diameter cores 152b, but the heights from the surface of the electrical substrate 110 to the centers of the large-diameter cores 152*a* are equal to those to the centers of the small-diameter cores 152*b*. This configuration enables, when the fiber array is connected to the end face of the optical waveguide 150, the centers of the large-diameter cores 152*a* and the small-diameter cores 152*b* to be aligned with the respective centers of the optical fibers, thereby enabling an optical coupling loss to be reduced.

Additionally, the mirrors 153*a* provided to the large-diameter cores 152*a* have the central heights equal to those of the mirrors 153*b* provided to the small-diameter cores 152*b*. The mirrors 153*a*, 153*b* are inclined 45 degrees to the directions vertical and parallel to the electrical substrate 110, which positions the centers of the mirrors 153*a*, 153*b* in a straight line when the optical waveguide 150 is also viewed from above. This configuration enables the mirrors 153*a*, 153*b* to be aligned with the respective VCSELs and PDs that the VCSEL/PD array chip 140 has, thereby enabling an optical coupling loss to be reduced.

Figure 3:
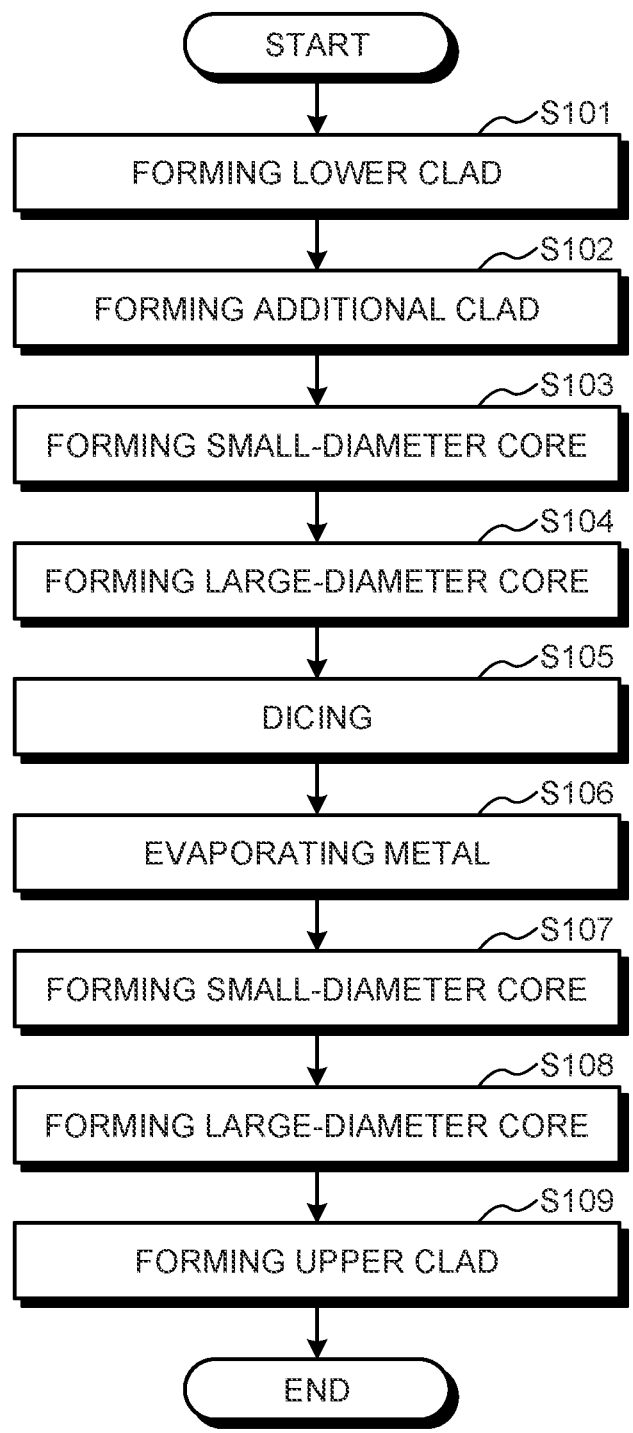
FIG. 3 is a flow diagram illustrating a method for manufacturing the optical waveguide according to the embodiment.

A method for manufacturing the optical waveguide 150 constructed as described above will be described next with reference to the flow diagram illustrated in FIG. 3. For a brief description, a method for manufacturing the optical waveguide 150 that has one large-diameter core 152*a* and one small-diameter core 152*b* will be described below by citing some specific examples.

Figure 4:
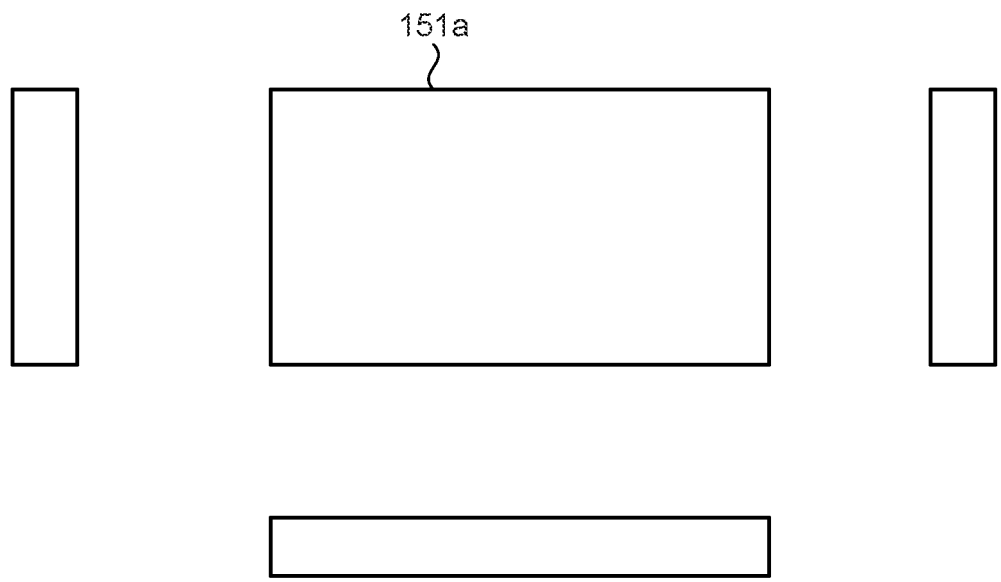
FIG. 4 is a diagram illustrating a specific example of a step of forming a lower clad.

A lower clad is first formed in a region on the electrical substrate 110 where the optical waveguide 150 is to be formed (Step S101). Specifically, as illustrated in FIG. 4, for example, a semi-cured epoxy resin, for example, that has been disposed on the electrical substrate 110 is cured by the application of heat or the irradiation of ultraviolet or other light to form a lower clad 151*a*. FIG. 4 is a four-view drawing of the formed lower clad 151*a*. The central figure in FIG. 4 is a plan view of the lower clad 151*a* when viewed from above, the left figure is a left side view illustrating a left end face of the lower clad 151*a*, the right figure is a right side view illustrating a right end face of the lower clad 151*a*, and the figure below is a front view illustrating a front face of the lower clad 151*a*. Construction examples of the optical waveguide 150 at steps will also be illustrated in similar four-view drawings below.

Figure 5:
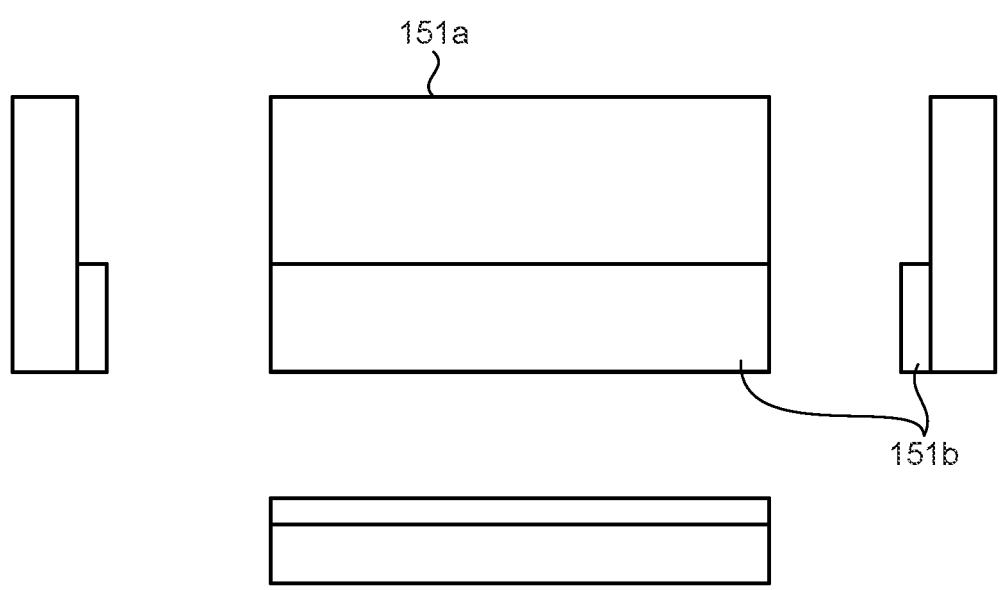
FIG. 5 is a diagram illustrating a specific example of a step of forming an additional clad.

An additional clad is formed in a region on the lower clad 151*a* where the small-diameter core 152*b* is to be formed (Step S102). Specifically, as illustrated in FIG. 5, for example, an epoxy resin is cured in a partial region of the lower clad 151*a* to form an additional clad 151*b*. The thickness of the additional clad 151*b* is equivalent to one-half the difference in core diameter between the large-diameter core 152*a* and the small-diameter core 152*b*. In other words, when the large-diameter core 152*a* has a core diameter of 60 μm and the small-diameter core 152*b* has a core diameter of 20 μm, for example, the difference in core diameter is 40 μm, so that the additional clad 151*b* has a thickness of 20 μm, which is one-half the difference in core diameter.

In this manner, the additional clad 151*b* is formed in the region where the small-diameter core 152*b* is to be formed, which enables the lower end of the small-diameter core 152*b* to be higher than the lower end of the large-diameter core 152*a*, thereby enabling the central heights of the small-diameter core 152*b* and the large-diameter core 152*a* to be aligned.

Figure 6:
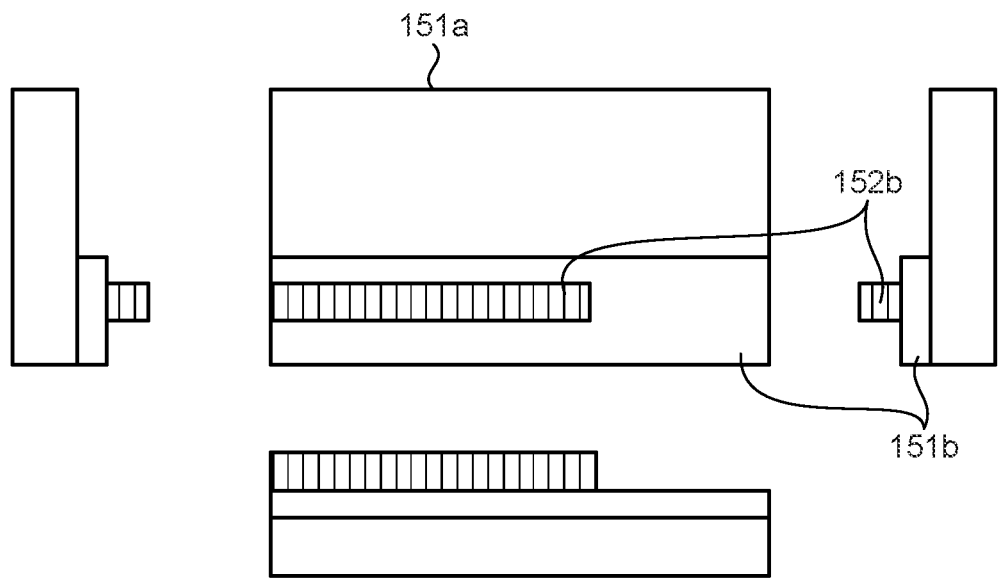
FIG. 6 is a diagram illustrating a specific example of a step of forming a small-diameter core.

The small-diameter core 152*b* is then formed on the additional clad 151*b* (Step S103). Specifically, as illustrated in FIG. 6, for example, a semi-cured epoxy resin, for example, that has been disposed and molded on the additional clad 151*b* is cured by the application of heat or the irradiation of ultraviolet or other light to form the small-diameter core 152*b*. Herein, the rectangular parallelepiped small-diameter core 152*b* is formed extending from one end of the additional clad 151*b* to a position where the mirror 153*b* is to be formed, as illustrated in FIG. 6.

Figure 7:
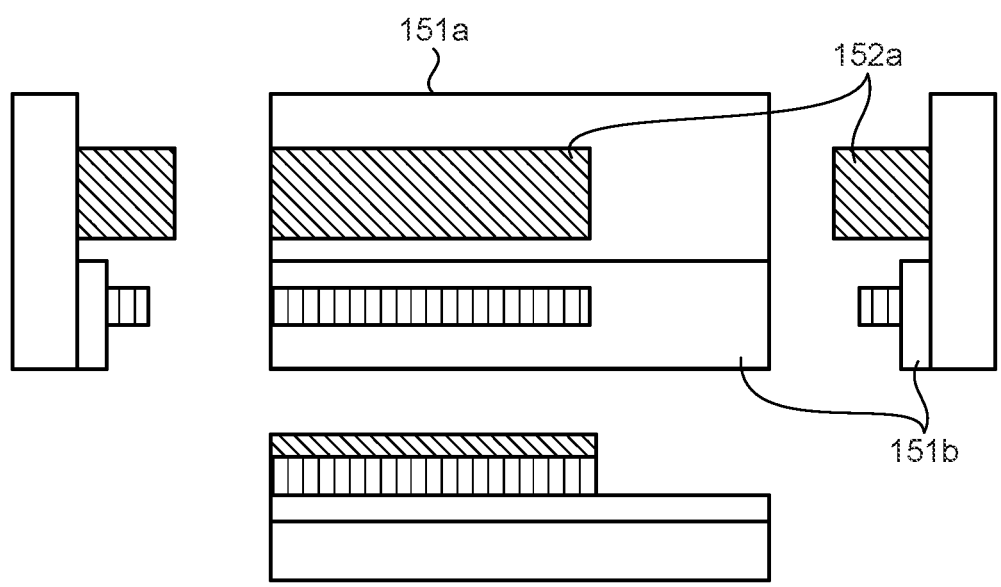
FIG. 7 is a diagram illustrating a specific example of a step of forming a large-diameter core.

The large-diameter core 152*a* is also formed on the lower clad 151*a* (Step S104). Specifically, as illustrated in FIG. 7, for example, a semi-cured epoxy resin, for example, that has been disposed and molded on the lower clad 151*a* is cured by the application of heat or the irradiation of ultraviolet or other light to form the large-diameter core 152*a*. Herein, the rectangular parallelepiped large-diameter core 152*a* is formed, the large-diameter core 152*a* having the same length as that of the small-diameter core 152*b* and extending from one end of the lower clad 151*a* to a position where the mirror 153*a* is to be formed, as illustrated in FIG. 7. As is evident from the left figure and the right figure in FIG. 7, because the additional clad 151*b* is formed, the central heights of the large-diameter core 152*a* and the small-diameter core 152*b* are the same.

Figure 8:
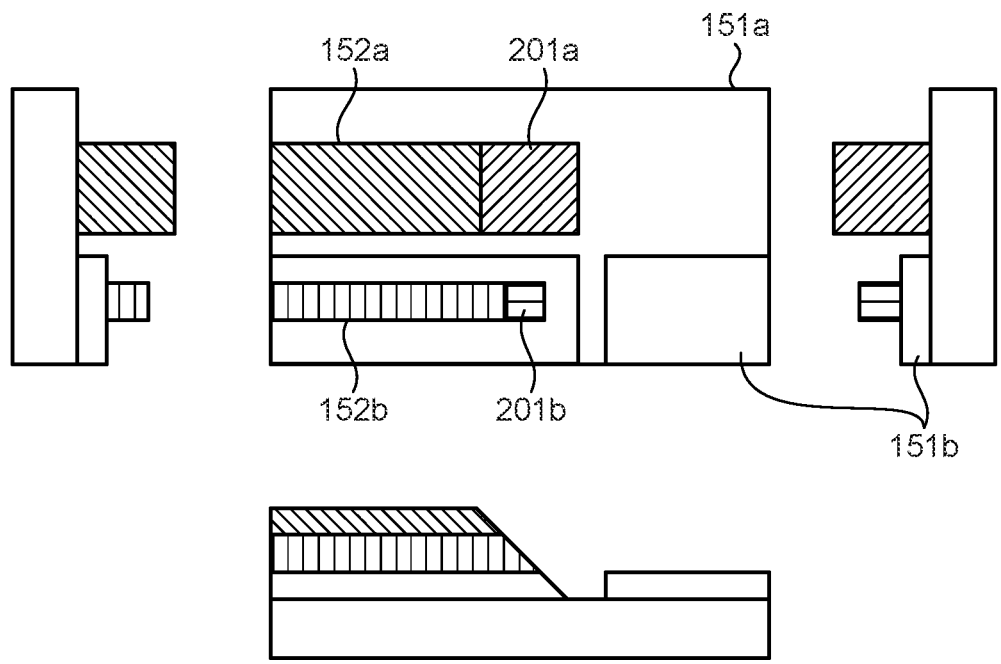
FIG. 8 is a diagram illustrating a specific example of a dicing step.

Once the large-diameter core 152*a* and the small-diameter core 152*b* have been formed, dicing is performed to cut the large-diameter core 152*a* and the small-diameter core 152*b* at positions where the mirrors 153*a*, 153*b* are to be formed (Step S105). Specifically, as illustrated in FIG. 8, for example, the tip of the large-diameter core 152*a* is cut and an inclined plane 201*a* is formed, the inclined plane 201*a* being inclined 45 degrees to a direction in which the large-diameter core 152*a* extends. The tip of the small-diameter core 152*b* is also cut and an inclined plane 201*b* is formed, the inclined plane 201*b* being inclined 45 degrees to a direction in which the small-diameter core 152*b* extends. Dicing of the large-diameter core 152*a* and the small-diameter core 152*b* may be performed simultaneously, and, in this case, a portion of the additional clad 151*b* corresponding to the cut part of the large-diameter core 152*a* is also cut. Because the central heights of the large-diameter core 152*a* and the small-diameter core 152*b* are the same, the centers of the inclined planes 201*a*, 201*b* are also positioned in a straight line when viewed from above.

Figure 9:
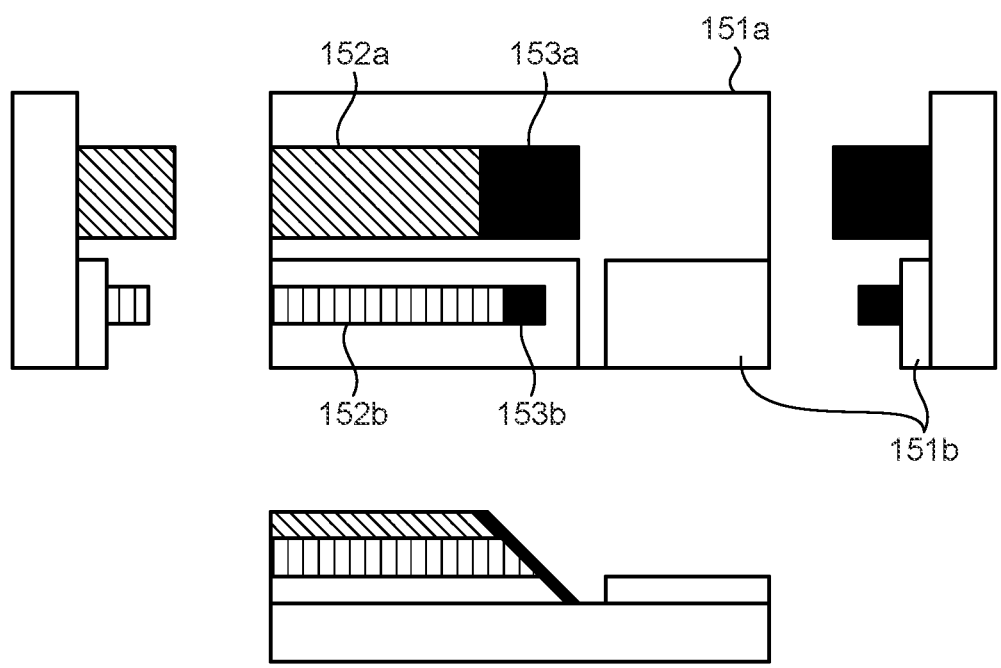
FIG. 9 is a diagram illustrating a specific example of a step of evaporating metal.

Metal is then evaporated onto the inclined planes 201*a*, 201*b*, thereby forming the mirrors 153*a*, 153*b* (Step S106). Specifically, as illustrated in FIG. 9, for example, metal film such as aluminum, for example, are evaporated onto the inclined planes 201*a*, 201*b*, thereby forming the mirrors 153*a*, 153*b*. The mirrors 153*a*, 153*b* illustrated in FIG. 9 reflect light from above in the rightward direction and reflect light from the rightward direction upward.

Figure 10:
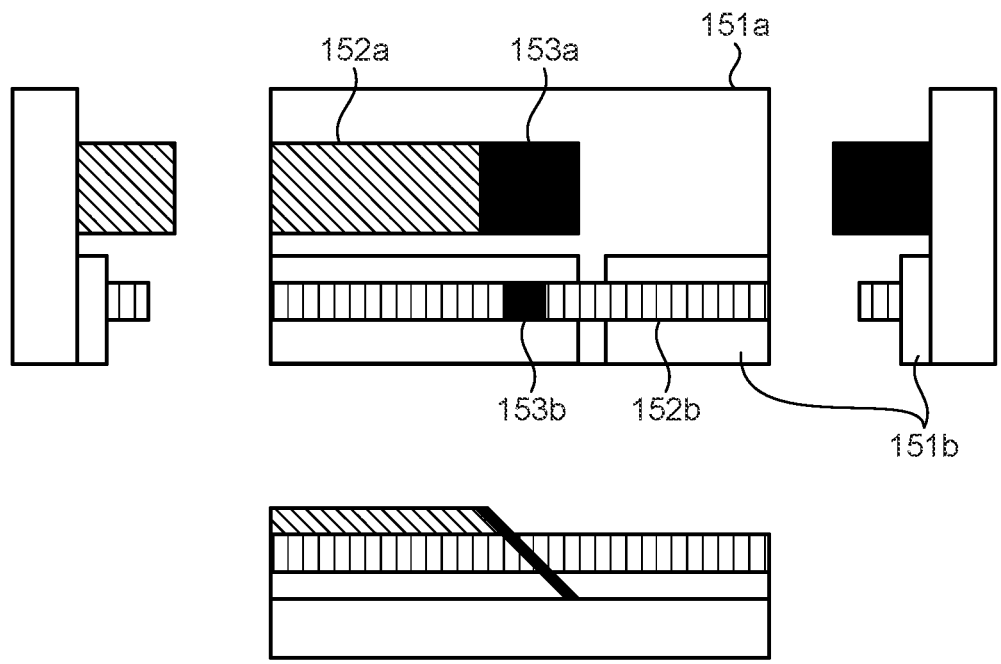
FIG. 10 is a diagram illustrating a specific example of a step of forming a small-diameter core.

Following this, a core serving as a path of light to the right of the mirrors 153*a*, 153*b* is formed. In other words, the small-diameter core 152*b* is formed to the right of the mirror 153*b* (Step S107). Specifically, as illustrated in FIG. 10, for example, the small-diameter core 152*b* continuous with the left-hand small-diameter core 152*b* and the mirror 153*b* that have already been formed is run to the right end of the additional clad 151*b*. At this time, in a case in which a portion of the additional clad 151*b* has been cut at the dicing step, the additional clad 151*b* may be supplemented so as to fill the cut part.

Figure 11:
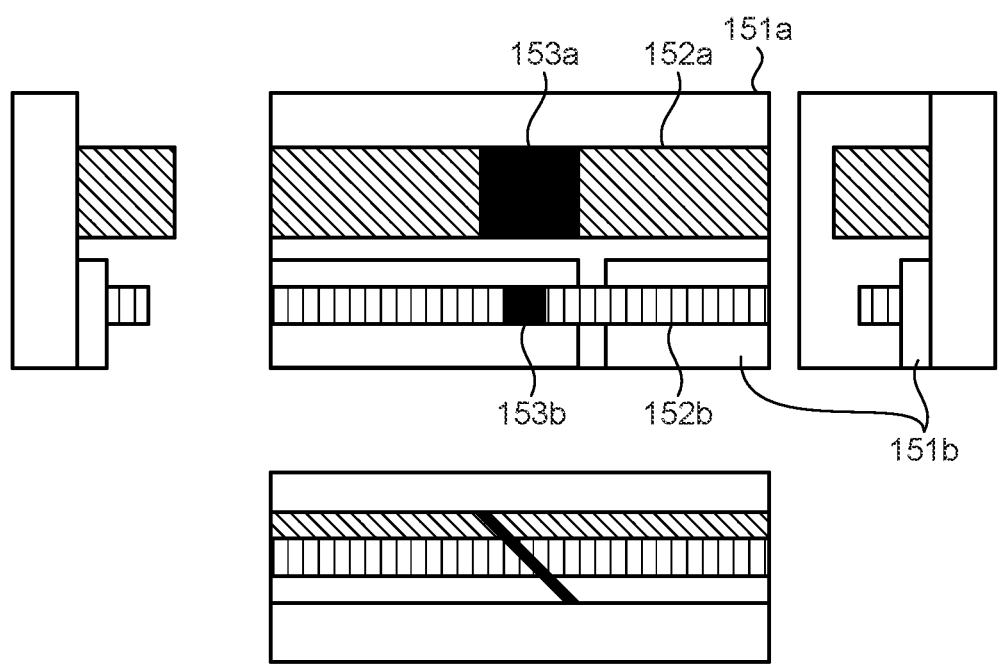
FIG. 11 is a diagram illustrating a specific example of a step of forming a large-diameter core.

Likewise, the large-diameter core 152*a* is formed to the right of the mirror 153*a* (Step S108). Specifically, as illustrated in FIG. 11, for example, the large-diameter core 152*a* continuous with the left-hand large-diameter core 152*a* and the mirror 153*a* that have already been formed is run to the right end of the lower clad 151*a*. In this manner, a path of light reflected by the mirrors 153*a*, 153*b* is formed.

Figure 12:
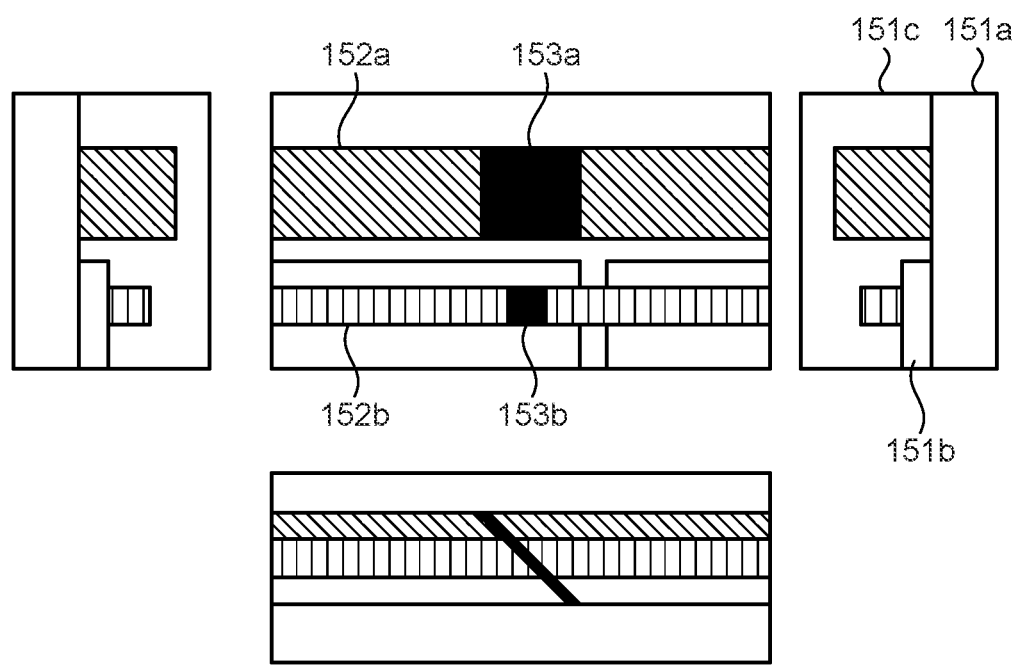
FIG. 12 is a diagram illustrating a specific example of a step of forming an upper clad.

An upper clad to cover the large-diameter core 152a and the small-diameter core 152b is formed (Step S109). Specifically, as illustrated in FIG. 12, for example, a semi-cured epoxy resin, for example, that has been disposed so as to cover the large-diameter core 152a and the small-diameter core 152b is cured by the application of heat or the irradiation of ultraviolet or other light to form an upper clad 151c. By means of this method, such optical waveguide 150 is formed on the electrical substrate 110 that the central heights of the large-diameter core 152a and the small-diameter core 152b are equal and that the centers of the mirrors 153a, 153b are positioned in a straight line when viewed from above.

Figure 13:
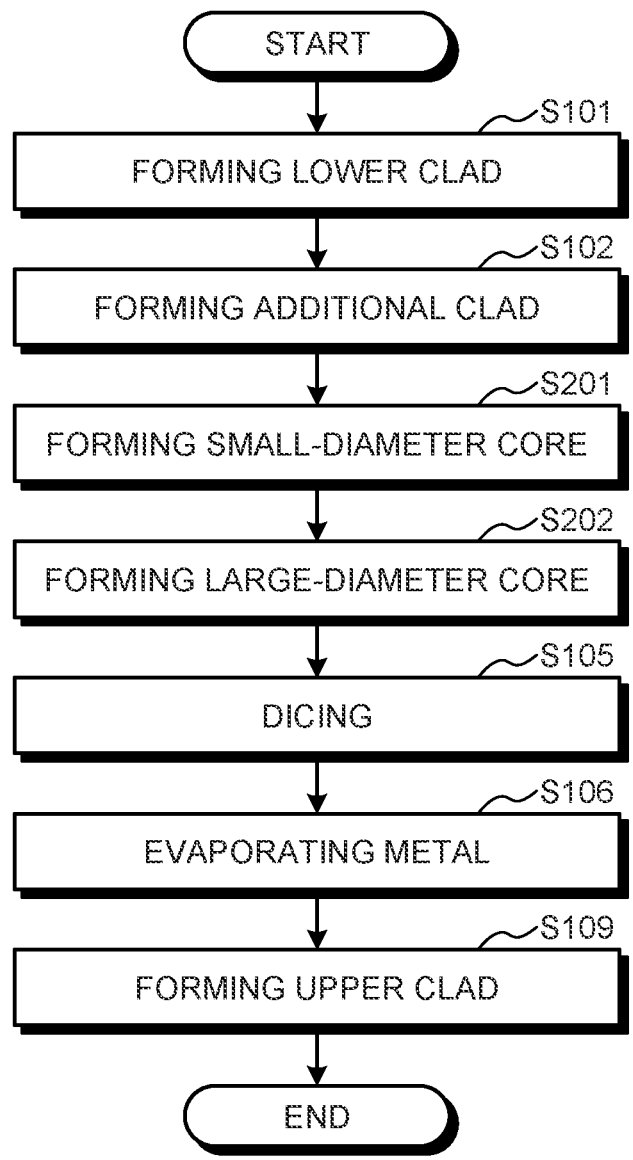
FIG. 13 is a flow diagram illustrating another method for manufacturing the optical waveguide according to the embodiment.

The above-mentioned method for manufacturing the optical waveguide 150 includes the steps of forming the large-diameter core 152a and the small-diameter core 152b before and after the step of forming the mirrors 153a, 153b. However, the method for manufacturing the optical waveguide 150 can be simplified by combining the steps of forming the large-diameter core 152a and the small-diameter core 152b into a single step. A simplified method for manufacturing the optical waveguide 150 will thus be described below with reference to the flow diagram illustrated in FIG. 13. In FIG. 13, the same reference sign is given to the same part as that in FIG. 3, and the description thereof is omitted.

Figure 14:
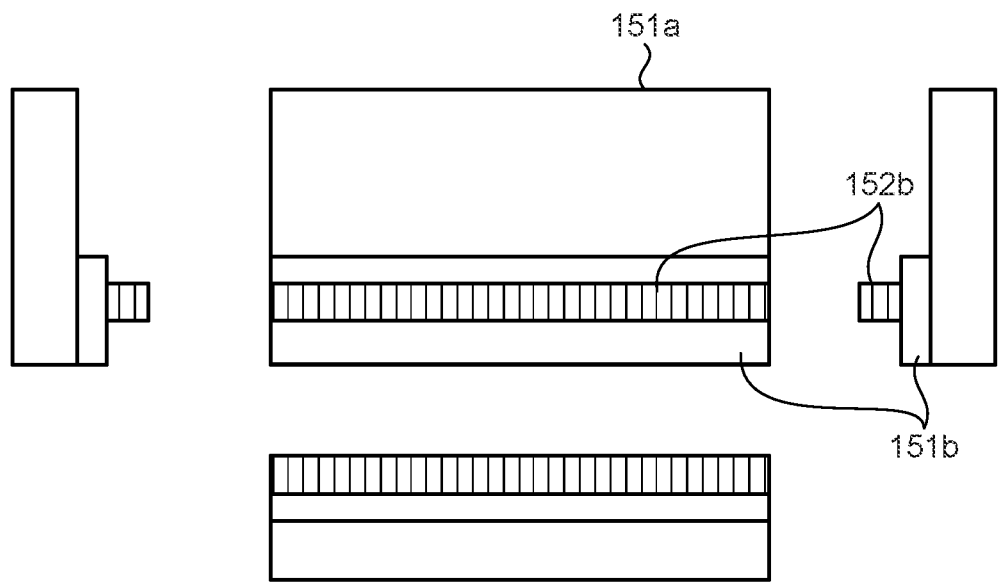
FIG. 14 is a diagram illustrating a specific example of a step of forming a small-diameter core.

As is the case with the above-mentioned method, the lower clad 151a and the additional clad 151b are first formed (Steps S101, S102). The small-diameter core 152b is then formed on the additional clad 151b (Step S201). Specifically, as illustrated in FIG. 14, for example, a semi-cured epoxy resin, for example, that has been disposed and molded on the additional clad 151b is cured by the application of heat or the irradiation of ultraviolet or other light to form the small-diameter core 152b. Herein, the rectangular parallelepiped small-diameter core 152b is formed extending from one end to the other end of the additional clad 151b, as illustrated in FIG. 14.

Figure 15:
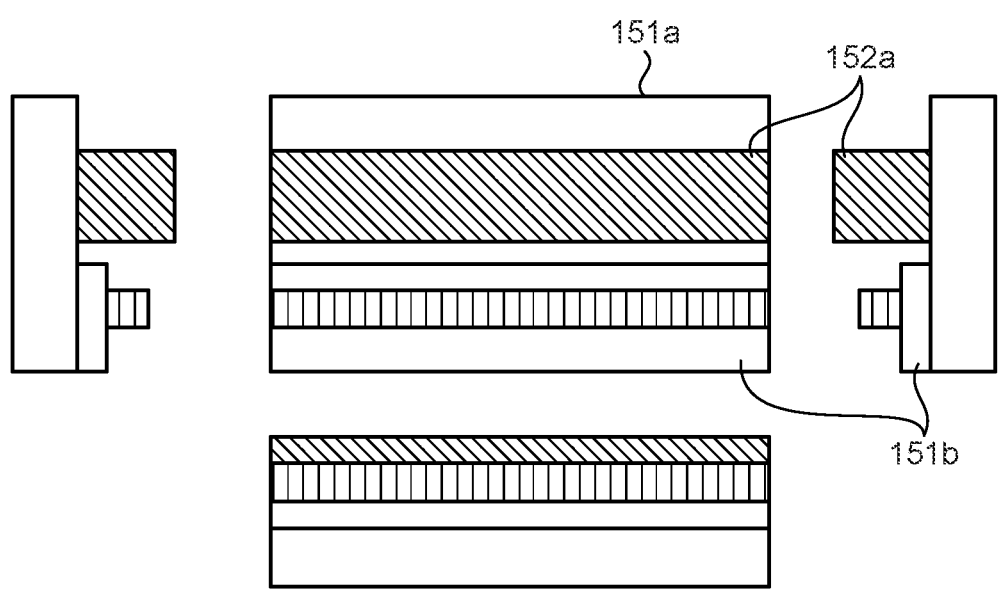
FIG. 15 is a diagram illustrating a specific example of a step of forming a large-diameter core.

The large-diameter core 152a is also formed on the lower clad 151a (Step S202). Specifically, as illustrated in FIG. 15, for example, a semi-cured epoxy resin, for example, that has been disposed and molded on the lower clad 151a is cured by the application of heat or the irradiation of ultraviolet or other light to form the large-diameter core 152a. Herein, the rectangular parallelepiped large-diameter core 152a is formed, the large-diameter core 152a having the same length as that of the small-diameter core 152b and extending from one end to the other end of the lower clad 151a, as illustrated in FIG. 15. As is evident from the left figure and the right figure in FIG. 15, because the additional clad 151b is formed, the central heights of the large-diameter core 152a and the small-diameter core 152b are the same.

Figure 16:
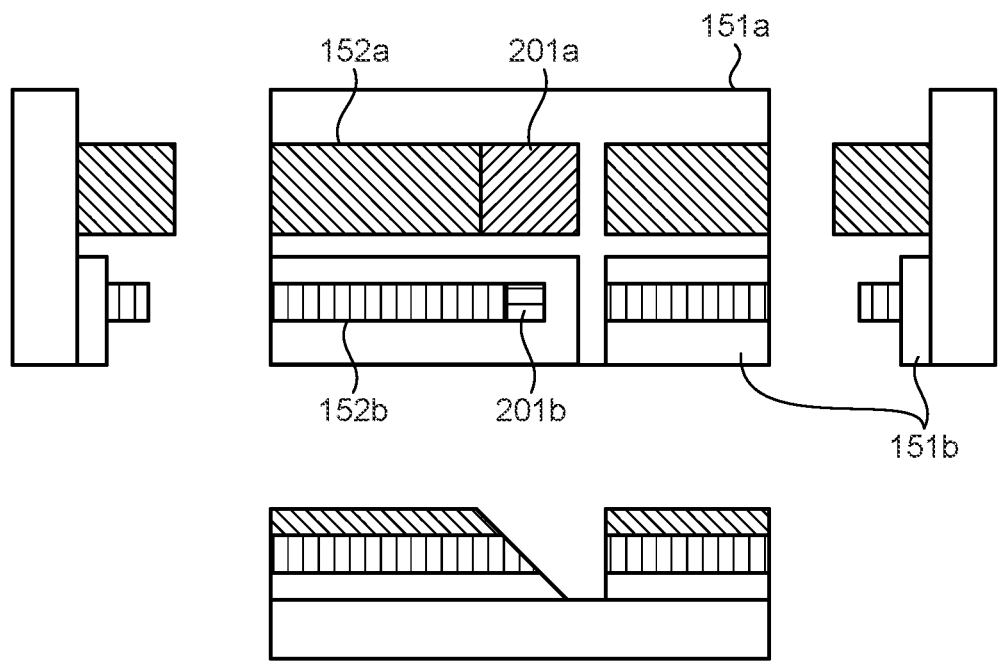
FIG. 16 is a diagram illustrating a specific example of a dicing step.

Once the large-diameter core 152a and the small-diameter core 152b have been formed, dicing is performed to cut the large-diameter core 152a and the small-diameter core 152b at positions where the mirrors 153a, 153b are to be formed (Step S105). Specifically, as illustrated in FIG. 16, for example, the central parts of the large-diameter core 152a and the small-diameter core 152b are cut and the inclined planes 201a, 201b are formed, the inclined planes 201a, 201b being inclined 45 degrees to directions in which the large-diameter core 152a and the small-diameter core 152b extend. Because dicing of the large-diameter core 152a and the small-diameter core 152b are performed simultaneously, a portion of the additional clad 151b corresponding to the cut part of the large-diameter core 152a is also cut. Because the central heights of the large-diameter core 152a and the small-diameter core 152b are the same, the centers of the inclined planes 201a, 201b are also positioned in a straight line when viewed from above.

Figure 17:
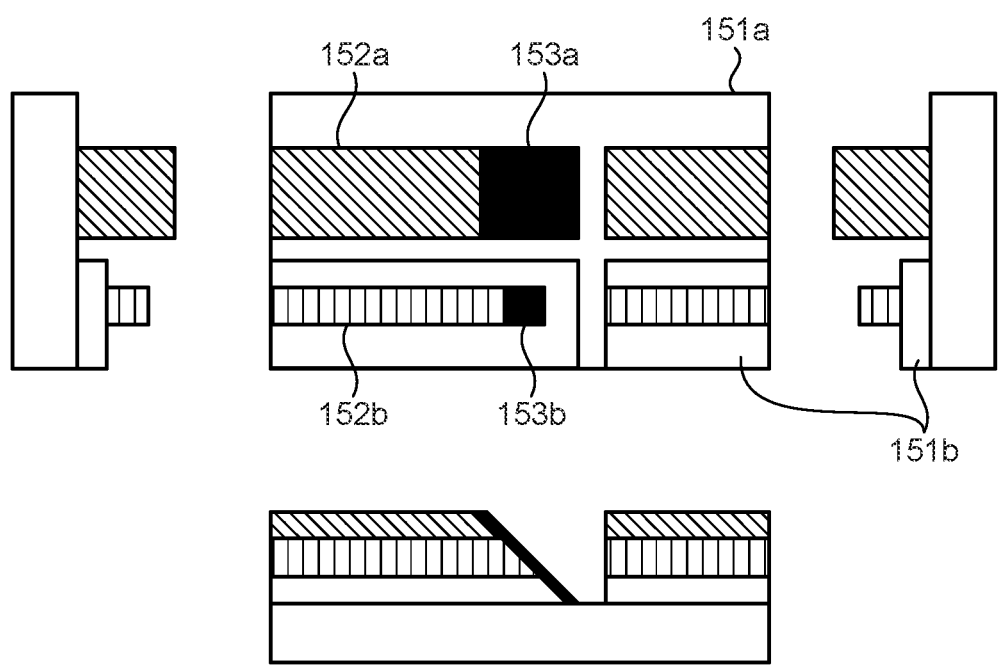
FIG. 17 is a diagram illustrating a specific example of a step of evaporating metal.

Metal is then evaporated onto the inclined planes 201a, 201b, thereby forming the mirrors 153a, 153b (Step S106). Specifically, as illustrated in FIG. 17, for example, metal films such as aluminum, for example, are evaporated onto the inclined planes 201a, 201b, thereby forming the mirrors 153a, 153b. The mirrors 153a, 153b illustrated in FIG. 17 reflect light from above in the rightward direction and reflect light from the rightward direction upward.

Consequently, the mirror 153a reflects light incident from the VCSEL above in the direction of the large-diameter core 152a remaining to the right of the mirror 153a. The mirror 153b reflects light incident from the small-diameter core 152b remaining to the right in the direction of the PD above. Although sections without cores are present between the mirror 153a and the right-hand large-diameter core 152a as well as between the mirror 153b and the right-hand small-diameter core 152b, these sections are as short as about 30 to 40 µm, for example, thereby causing only a small loss due to light leakage into the surroundings.

Thus, with the sections without cores left, an upper clad to cover the large-diameter core 152a and the small-diameter core 152b is formed (Step S109). By means of this method, such optical waveguide 150 is formed on the electrical substrate 110 that the central heights of the large-diameter core 152a and the small-diameter core 152b are equal and that the centers of the mirrors 153a, 153b are positioned in a straight line when viewed from above.

According to such a manufacturing method, performing the step of forming the large-diameter core 152a and the step of forming the small-diameter core 152b once is sufficient, and the optical waveguide 150 can be manufactured simply and efficiently.

Figure 18:
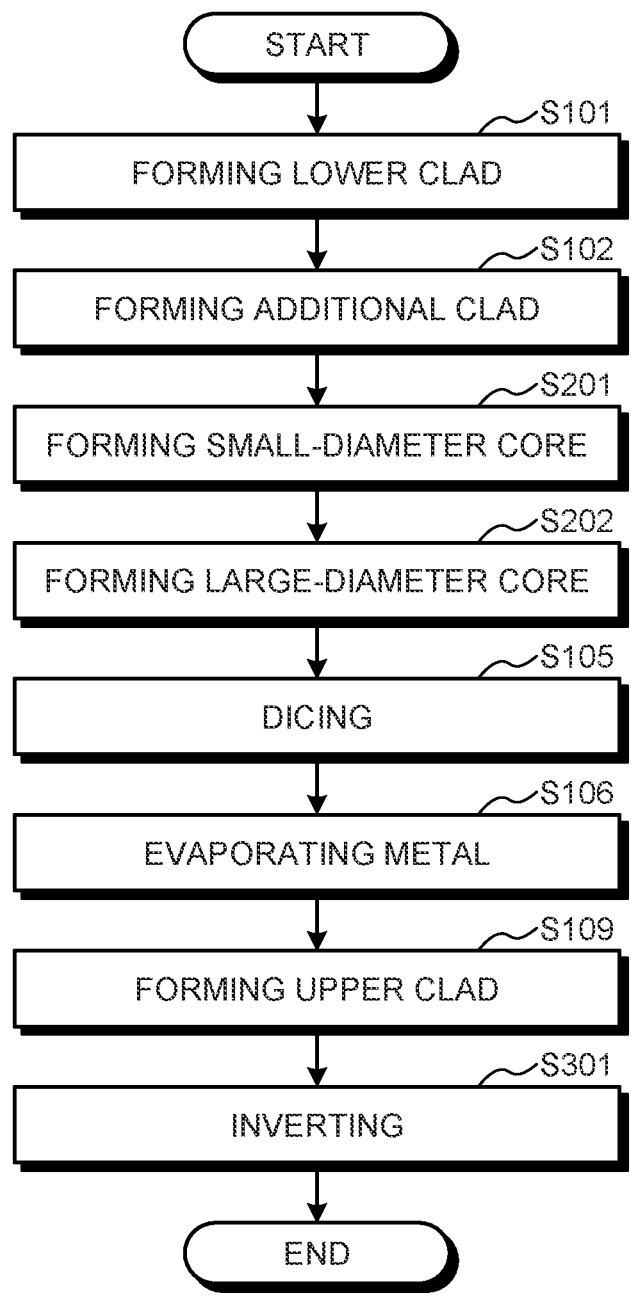
FIG. 18 is a flow diagram illustrating still another method for manufacturing the optical waveguide according to the embodiment.

Although the above-mentioned method for manufacturing the optical waveguide 150 forms the optical waveguide 150 directly on the top face of the electrical substrate 110, it is possible to form the optical waveguide 150 independently on the top face of a base material such as a glass substrate, for example, remove the finished optical waveguide 150 from the base material, and mount the optical waveguide 150 on the top face of the electrical substrate 110. A manufacturing method for forming the optical waveguide 150 independently will thus be described below with reference to the flow diagram illustrated in FIG. 18. In FIG. 18, the same reference sign is given to the same part as that in FIG. 3, and the description thereof is omitted.

The lower clad 151a and the additional clad 151b are first formed on a base material such as a glass substrate, for example (Steps S101, S102). The small-diameter core 152b is then formed on the additional clad 151b (Step S103). Herein, the rectangular parallelepiped small-diameter core 152b is formed extending from one end of the additional clad 151b to a position where the mirror 153b is to be formed. The large-diameter core 152a is also formed on the lower clad 151a (Step S104). Herein, the rectangular parallelepiped large-diameter core 152a is formed, the large-diameter core 152a having the same length as that of the small-diameter core 152b and extending from one end of the lower clad 151a to a position where the mirror 153a is to be formed.

Once the large-diameter core 152a and the small-diameter core 152b have been formed, dicing is performed to cut the large-diameter core 152a and the small-diameter core 152b at the positions where the mirrors 153a, 153b are to be formed (Step S105). In other words, the tips of the large-diameter core 152a and the small-diameter core 152b are cut, and the inclined planes 201a, 201b are formed. Metal is then evaporated onto the inclined planes 201a, 201b, thereby forming the mirrors 153a, 153b (Step S106). These steps have formed the large-diameter core 152a extending from one end of the lower clad 151a to the mirror 153a and the small-diameter core 152b extending from one end of the additional clad 151b to the mirror 153b.

Figure 19:
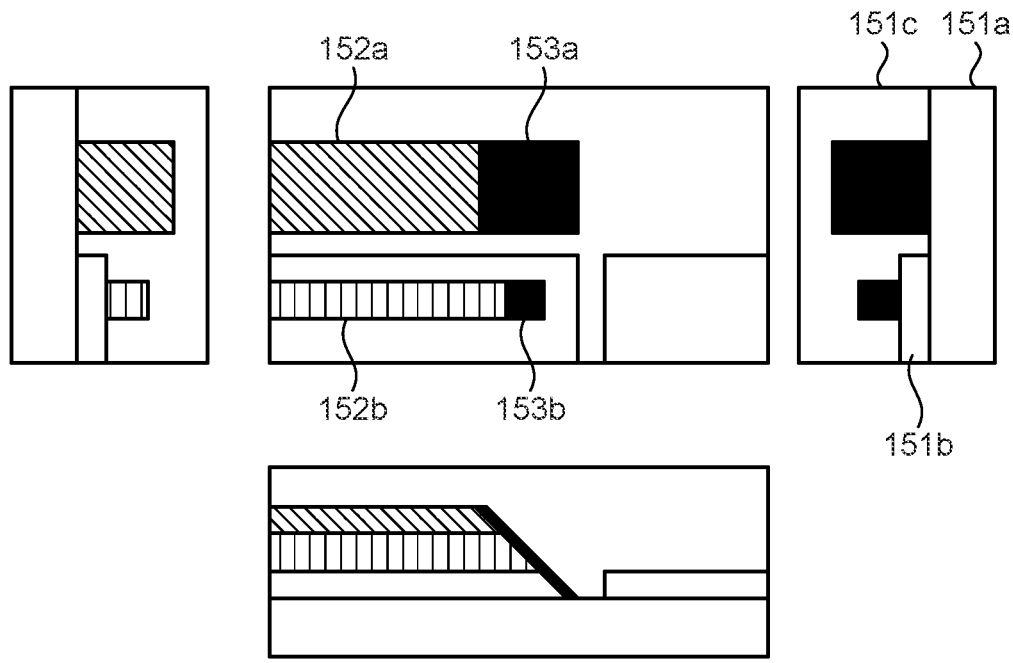
FIG. 19 is a diagram illustrating a specific example of a step of forming an upper clad.

An upper clad to cover the large-diameter core 152a and the small-diameter core 152b is formed (Step S109). Specifically, as illustrated in FIG. 19, for example, a semi-cured epoxy resin, for example, that has been disposed so as to cover the large-diameter core 152a and the small-diameter core 152b is cured by the application of heat or the irradiation of ultraviolet or other light to form the upper clad 151c. As illustrated in FIG. 19, the large-diameter core 152a and the small-diameter core 152b are not formed to the right of the mirrors 153a, 153b. Meanwhile, the large-diameter core 152a and the small-diameter core 152b are formed to the left of the mirrors 153a, 153b.

Figure 20:
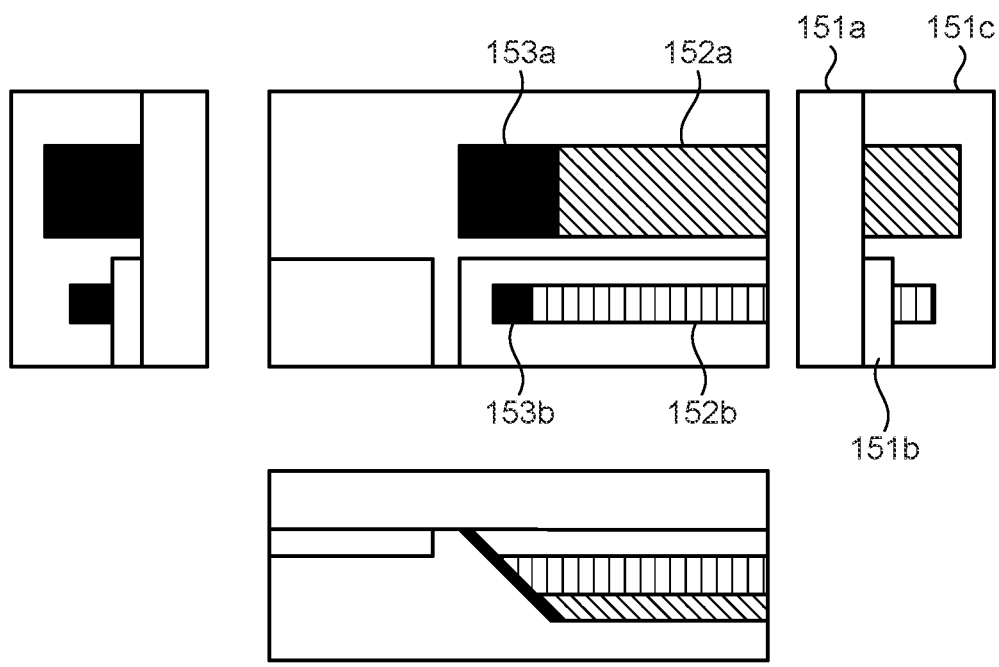
FIG. 20 is a diagram illustrating a specific example of an inverting step.

Following this, the optical waveguide 150 in which the upper clad 151c has been formed last is removed from the base material, and the entire optical waveguide 150 is inverted and mounted on the electrical substrate 110 (Step S301). In other words, the entire optical waveguide 150 is inverted, whereby the optical waveguide 150 is mounted on the electrical substrate 110 with the lower clad 151a positioned upward and the upper clad 151c positioned downward, as illustrated in FIG. 20, for example. The faces of the mirrors 153a, 153b that respectively come in contact with the large-diameter core 152a and the small-diameter core 152b are used to reflect light. As a result, in FIG. 20, the mirror 153a reflects light incident from the VCSEL above to the large-diameter core 152a to the right of the mirror 153a. The mirror 153b reflects light incident from the small-diameter core 152b to the right in the direction of the PD above.

According to such a manufacturing method, the optical waveguide 150 is formed independently on a base material such as a glass substrate, for example, is removed from the base material, and thereafter the optical waveguide 150 is inverted and mounted on the electrical substrate 110. In this manner, the step of forming the large-diameter core 152a and the step of forming the small-diameter core 152b are each performed once, and the mirrors 153a, 153b can respectively be continuous with the large-diameter core 152a and the small-diameter core 152b, which can prevent light leakage resulting from the absence of cores.

As described above, according to the present embodiment, in a case in which an optical waveguide is formed that has a large-diameter core and a small-diameter core with core diameters different from each other, an additional clad is formed in a region where the small-diameter core is to be formed, and the large-diameter core and the small-diameter core are formed with the centers of the sections positioned in a straight line. This configuration enables, when a fiber array is connected to an end face of the optical waveguide, the centers of the large-diameter core and the small-diameter core to be aligned with the respective centers of optical fibers, thereby enabling an optical coupling loss in the optical waveguide including a plurality of cores to be reduced.

Additionally, forming mirrors inclined 45 degrees to directions in which the large-diameter core and the small-diameter core extend enables the centers of the mirrors for the large-diameter core and the small-diameter core to be also positioned in a straight line, thereby enabling an optical coupling loss between an array chip formed by lining up VCSEL(s)/PD(s), for example, and the respective mirrors to be reduced.

In the embodiment mentioned above, light travels in the vertical direction to the electrical substrate 110 at one end (in other words, the part where the optical waveguide 150 is connected to the VCSEL/PD array chip 140) of the optical waveguide 150, while light travels in the direction parallel to the electrical substrate 110 at the other end (in other words, the part where the optical waveguide 150 is connected to the fiber array) of the optical waveguide 150. However, the traveling directions of light at the ends of the optical waveguide 150 are not limited to the foregoing.

Figure 21:
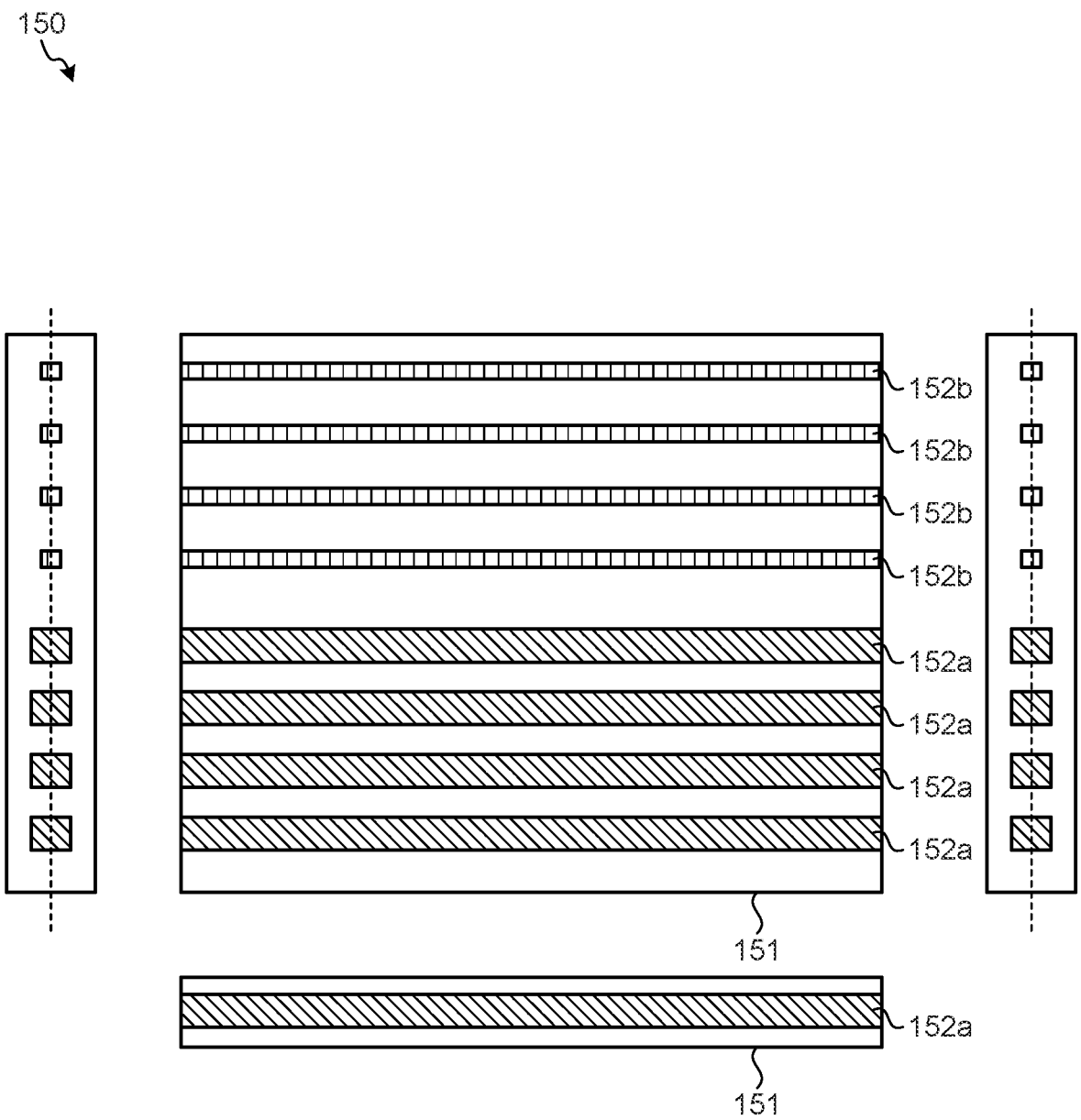
FIG. 21 is a four-view diagram illustrating another construction of the optical waveguide substrate according to the embodiment.

Specifically, as illustrated in FIG. 21, for example, the traveling directions of light may be parallel to the electrical substrate 110 at both ends of the large-diameter cores 152a and the small-diameter cores 152b. In this case also, the central heights of the large-diameter cores 152a and the small-diameter cores 152b are equal at both ends of the optical waveguide 150. This configuration enables, when the fiber array is connected to the end face of the optical waveguide 150, the centers of the large-diameter cores 152a and the small-diameter cores 152b to be aligned with the respective centers of the cores of the optical fibers, thereby enabling an optical coupling loss to be reduced.

Figure 22:
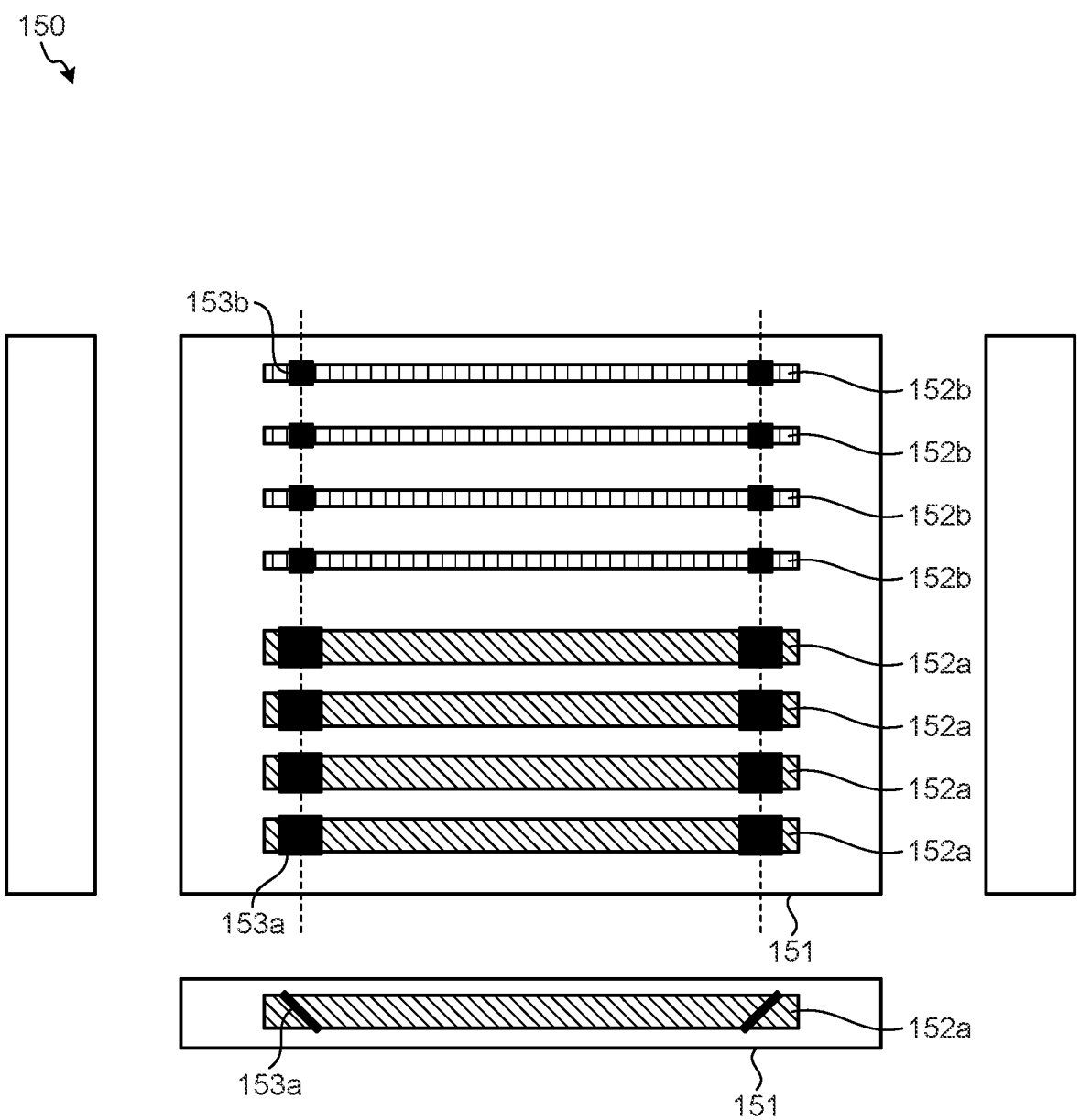
FIG. 22 is a four-view diagram illustrating still another construction of the optical waveguide substrate according to the embodiment.

Furthermore, as illustrated in FIG. 22, for example, the mirrors 153a, 153b are provided at both ends of the large-diameter cores 152a and the small-diameter cores 152b, and the traveling directions of light may be vertical to the electrical substrate 110. In this case also, the central heights of the sections are equal at the central parts of the large-diameter cores 152a and the small-diameter cores 152b, and the centers of the mirrors 153a, 153b are positioned in a straight line at both ends of the large-diameter cores 152a and the small-diameter cores 152b when viewed from above. This configuration enables, when the fiber array is connected from above the mirrors 153a, 153b at the ends of the optical waveguide 150, for example, the centers of the mirrors 153a, 153b to be aligned with the respective centers of the cores of the optical fibers, thereby enabling an optical coupling loss to be reduced.

According to one aspect of the optical waveguide substrate and the method for manufacturing the optical waveguide discussed herein, the effect is exhibited of being able to reduce an optical coupling loss in the optical waveguide including a plurality of cores.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical waveguide substrate comprising:
a substrate;
a clad disposed on a plane of the substrate and made of a transparent material; and
a plurality of cores that are surrounded by the clad, extend in parallel with the plane of the substrate and are made of a transparent material having a refractive index different from a refractive index of the clad, the cores including at least a pair of cores with diameters different from each other, wherein the cores are provided at positions where centers of sections of the cores are all positioned in a straight line, and the at least the pair of cores have lower ends different in heights within the clad from each other.

2. The optical waveguide substrate according to claim 1, further comprising a side face that exposes end faces of the cores, wherein to the side face, a fiber array that is obtained by arranging a plurality of optical fibers is connectable.

3. An optical waveguide substrate comprising:

a substrate;

a clad disposed on a plane of the substrate and made of a transparent material;

a plurality of cores that are surrounded by the clad, extend in parallel with the plane of the substrate and are made of a transparent material having a refractive index different from a refractive index of the clad, the cores including at least a pair of cores with diameters different from each other;

a plurality of mirrors that are formed on inclined planes formed on the respective cores and inclined to the plane of the substrate and that reflect light, wherein the cores are provided at positions where centers of sections of the cores are all positioned in a straight line, and the mirrors are formed at positions where centers of the mirrors are all positioned in a straight line when viewed from a vertical direction to the plane of the substrate.

4. The optical waveguide substrate according to claim 3, further comprising an optical component in which a light source and a light receiving element are lined up, wherein the optical component has the light source and the light receiving element disposed at such positions as to face the respective mirrors.

5. A method for manufacturing an optical waveguide, the method comprising:

forming a first clad using a transparent material;

forming a second clad using the transparent material in a partial region on the first clad;

forming a first core on the second clad;

forming a second core having a larger core diameter compared to the first core on the first clad; and forming a third clad to cover the first core and the second core, wherein the forming the second clad includes forming the second clad having a thickness that is equivalent to one-half a difference in core diameter between the first core and the second core.

6. The method for manufacturing an optical waveguide according to claim 5, the method further comprising:

forming inclined planes by cutting the first core and the second core; and forming mirrors by evaporating metal onto the inclined planes.

7. The method for manufacturing an optical waveguide according to claim 5, wherein the forming the first clad includes:

forming the first clad on a given base material;

after the third clad is formed, removing the first clad from the base material; and inverting an optical waveguide that includes the first clad, the second clad, the third clad, the first core, and the second core, and mounting the optical waveguide substrate on a substrate.

8. The optical waveguide substrate according to claim 1, further comprising a plurality of mirrors that are formed on inclined planes formed on the respective cores and inclined to the plane of the substrate and that reflect light, wherein the mirrors are formed at positions where centers of the mirrors are all positioned in a straight line when viewed from a vertical direction to the plane of the substrate.

9. The optical waveguide substrate according to claim 8, further comprising an optical component in which a light source and a light receiving element are lined up, wherein the optical component has the light source and the light receiving element disposed at such positions as to face the respective mirrors.

* * * * *